United States Patent [19]

Mann

[11] 4,155,419

[45] May 22, 1979

[54] APPARATUS FOR CONTROLLING THE TRAVELING SPEED OF A MOTOR VEHICLE

[75] Inventor: Arnold Mann, Bieber, Fed. Rep. of Germany

[73] Assignee: VDO Adolf Schindling AG, Frankfurt am Main, Fed. Rep. of Germany

[21] Appl. No.: 831,899

[22] Filed: Sep. 9, 1977

[30] Foreign Application Priority Data

Sep. 16, 1976 [DE] Fed. Rep. of Germany ........ 2641670

[51] Int. Cl.² .............................................. B60K 31/00
[52] U.S. Cl. ................................. 180/105 E; 123/102
[58] Field of Search ................. 180/105 R, 105 E, 98; 123/102

[56] References Cited

U.S. PATENT DOCUMENTS

| | | | |
|---|---|---|---|
| 3,828,742 | 8/1974 | Weis | 123/102 |
| 3,889,647 | 6/1975 | Rachel | 123/102 |
| 4,006,791 | 2/1977 | Feldmann et al. | 180/105 R X |

Primary Examiner—Richard A. Bertsch
Assistant Examiner—Michael Mar
Attorney, Agent, or Firm—Martin A. Farber

[57] ABSTRACT

An apparatus for controlling the traveling speed of a motor vehicle with an electric control unit, which unit compares the then present actual traveling speed of a vehicle with a predetermined desired nominal traveling speed and transmits a signal which is dependent on the size of the deviation to a control stage. The control stage comprises an actuator acting on an element, preferably the throttle valve, which influences the ratio of the fuel-air mixture which is fed to the motor of the vehicle. An adjustment unit adjusts the actuator upon every movement reversal by a definite given amount in the new movement direction.

7 Claims, 5 Drawing Figures

APPARATUS FOR CONTROLLING THE TRAVELING SPEED OF A MOTOR VEHICLE

The invention relates to an apparatus for controlling the traveling speed of a motor vehicle with an electric control unit, which unit compares the then present actual traveling speed of a vehicle with a predetermined desired nominal traveling speed, and transmits a signal which is dependent on the size of the deviation to a control stage, the control stage comprising an actuator acting on an element (preferably the throttle valve) which influences the ratio of the fuel-air mixture which is fed to the motor of the vehicle.

With known devices of this type, in the controlled driving operation speed changes of many km/hr occur, that is the vehicle does not move as desired with a constant speed, but rather with a speed which oscillates about an average value. This effect is based essentially on the play of the mechanical parts between the actuator and the throttle valve, which play can be reduced to a degree which no longer is disturbing, only with some motor vehicles which have a favorable arrangement of the throttle control rod and with a considerable production expense. Due to the large production expenses therefor, heretofore also with these motor vehicles, a certain swinging of the actual speed about an average value is always tolerated and accepted as a compromise in the regulated condition.

It is an object of the invention to set forth and provide means and measures by which speed changes of the previously described type are prevented in the regulated condition. Moreover the measures should be able to be realized as far as possible without a large expense.

It is another object of the invention to aid the solution of the above-mentioned objective, starting out from the device of the introductory mentioned type, in the manner that means are present which with every movement reversal, shift and adjust the actuator by a definite predetermined amount in the new movement direction.

By the measures in accordance with the present invention the hysteresis issuing from the play of the mechanical parts between the actuator and the throttle valve can be so strongly reduced that speed changes of the previously described type only still occur to a negligible extent. With control devices with a pneumatic actuator, beyond that, by realization of the measures in accordance with the present invention, the pressure medium consumption is substantially reduced. This is a particular advantage of the present invention.

The adjustability of the actuator in the above described manner can be realized, with mechanical as well as also with electrical means, whereby the electrical means is preferred because of the lower manufacturing expense associated therewith. In a preferred embodiment form, electrical means are provided which discontinuously lower and raise, respectively, the control signal for the actuator by a definite amount during a change producing a reversal of the movement of the actuator. With a device with a control stage which is applied with a direct or d.c. voltage signal, which signal is dependent on the size of the deviation, this electrical means for example, can be an operational amplifier the negative input of which is connected to ground via a capacitor and to the output of the amplifier via two diodes in antiparallel connection.

With the above and other objects and advantages in view, the present invention will become more clearly understood in connection with the following detailed description of a preferred embodiment, when considered with the accompanying drawings, of which:

Figure 1A:
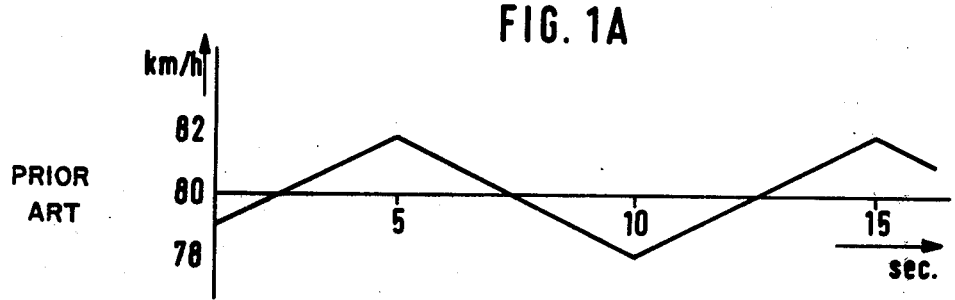
FIG. 1A is a graph of speed vs. time of a vehicle with known control device.
Figure 1B:
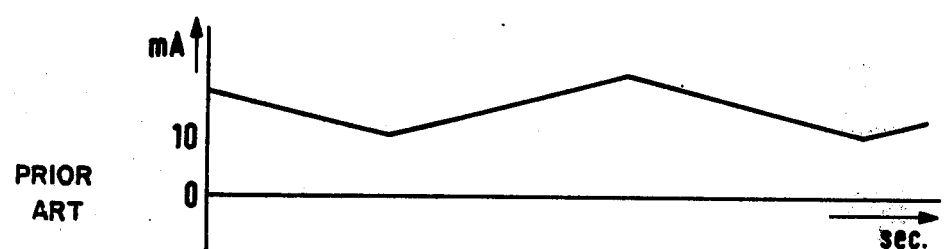
FIG. 1B is a graph of the current applied to the control stage thereof vs. time.

With a known control device of the previously mentioned type, in the controlled driving operation a speed change takes place over time as illustrated in FIG. 1A. The speed of the vehicle oscillates time-wise about a nominal value, for example, of 80 km/hour with ±2 km/hour. FIG. 1B shows the oscillation of the signal which is dependent on the control deviation, which signal is applied to the input of the control stage. Note when the speed increases compared to the set desired speed, the control deviation signal decreases so as to lower the speed back to its set desired value and vice versa. Thereby the actuator of the throttle valve is regulated by a cooperative electromechanical transducer operatively receiving this control signal.

Figure 2A:
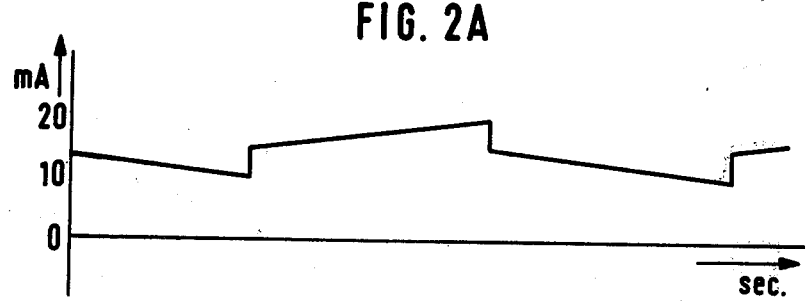
FIG. 2A is a graph of current vs. time of the signal applied to the control stage of the device of the present invention.
Figure 2B:
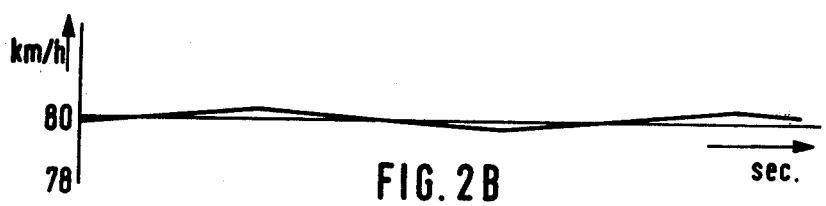
FIG. 2B is a graph of speed vs. time of a vehicle controlled with the present control device.

In accordance with the invention, if the control device is provided with electrical means 10 (FIG. 3) which intermittently discontinuously respectively lowers and raises the control signal for the actuator by the same certain fixed amount upon every change which causes a movement reversal of the actuator (namely at the speed reversal points), thus there occurs a course of the signal applied to the input of the control stage as illustrated in FIG. 2A. By means of the prompt, immediate stepped signal change upon the occurrence of a speed change (which speed change controls a movement reversal of the actuator), the existing play of the mechanical parts between the actuator and the throttle valve is quickly overcome, and accordingly every movement of the actuator is transmitted play-free to the throttle valve. As a consequence of this, an approximately or nearly constant course of the vehicle speed occurs in the controlled driving operation, as illustrated in FIG. 2B.

Figure 3:
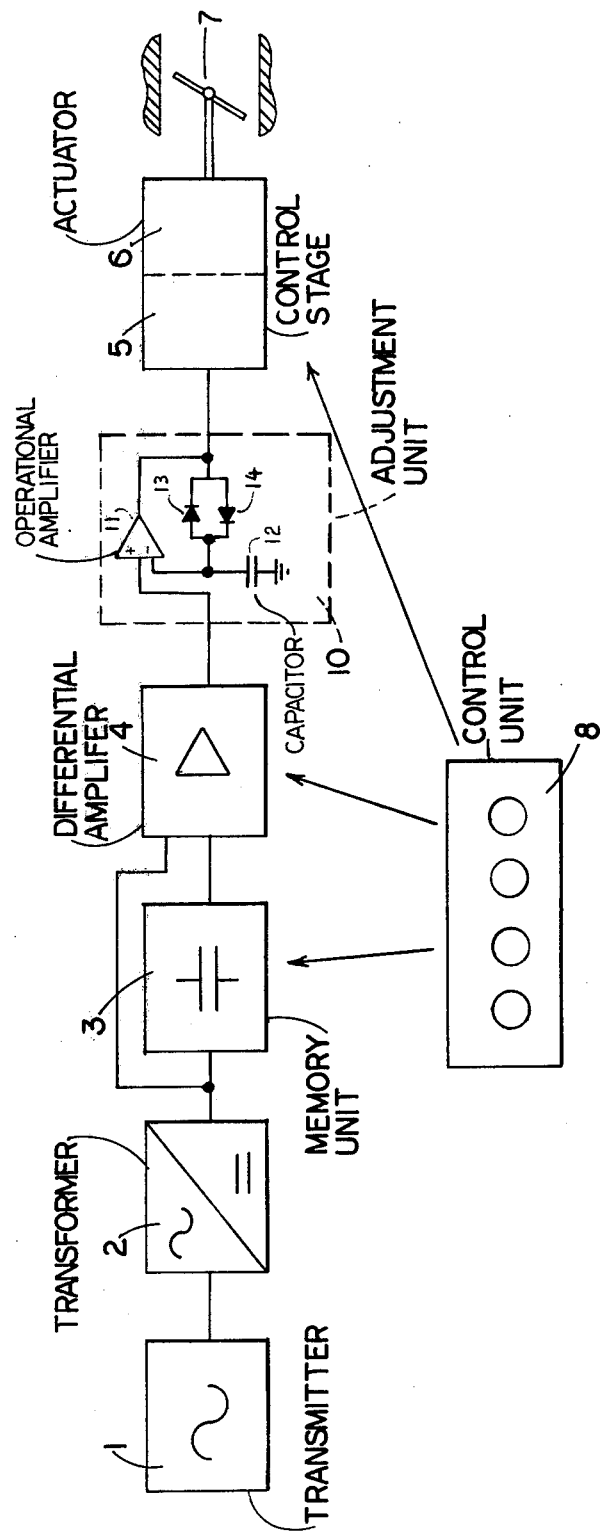
FIG. 3 is a schematic diagram of the device of the present invention.

Referring now to FIG. 3 of the drawing, the illustrated driving or traveling speed control device of the invention includes: a speed pickup detector or transmitter 1, the output signal of which has a frequency proportional to the traveling speed of the vehicle; a frequency-voltage-transformer 2 connected to the transmitter 1, the output signal of the transformer 2 being fed in one path indirectly to a differential amplifier 4 via a storage or memory unit 3 and in another path directly to the differential amplifier 4, the latter comparing therein the instantaneous actual value of the speed with a speed nominal value. In the case of a deviation of the actual value from the nominal value, the potential in the comparator output is raised or lowered, the latter being operatively connected with a control stage 5 via the adjustment unit 10. The control stage 5 includes a pneumatic actuator 6, which is coupled to the throttle valve 7 on the motor of the vehicle. In addition a control or operating unit 8 is provided in which besides other switches, a switch for setting of the nominal speed is located. With respect to an example of additional construction and the manner of operation, reference is made to the disclosure of my commonly assigned U.S. Pat. No. 4,039,043 issued Aug. 2, 1977, entitled, Apparatus for Controlling the Traveling Speed of a Motor Vehicle, hereby incorporated by reference herein.

In accordance with the present invention, the electical adjustment unit 10 is provided as the means for adjusting the actuator 6 immediately upon every reversal of movement by the same definite given amount in the new movement direction for each change causing a movement reversal of the actuator. The adjustment unit 10 can comprise an operational amplifier 11 having a positive input connected to the output of the differential amplifier 4, the negative input of which is connected to ground via a capacitor 12 and to the output via two diodes 13 and 14 in antiparallel connection, sending the signal of FIG. 2A into the control stage 5.

I claim:

1. An apparatus for controlling the traveling speed of a motor vehicle with an electric control unit, which unit compares the then present actual traveling speed of a vehicle with a desired predetermined nominal traveling speed and transmits a signal which is dependent on the size of the deviation for operatively controlling an element, preferably the throttle valve, which element influences the ratio of the fuel-air mixture fed to the vehicle motor, comprising
    a control stage means for receiving the signal, said control stage means including an actuator means for operatively acting on said element, and
    means for adjusting and shifting said actuator means upon every change causing a reversal of movement direction of said actuator means by a definite predetermined amount in the new movement direction.

2. The apparatus as set forth in claim 1, wherein said means for adjusting said actuator means further for providing a control signal for said actuator means upon a change causing a reversal of movement of said actuator means such that said control signal discontinuously decreases and increases, respectively, by a definite amount.

3. The apparatus as set forth in claim 2, wherein said adjusting means comprises,
    an operation amplifier having a positive input means for receiving a signal indicative of the aforementioned each reversal of movement, a negative input, and an output connected to said control stage means,
    a capacitor connected to said negative input on one side thereof and grounded on its other side,
    two diodes connected in parallel in reverse directions to one another,
    said two diodes connected at one common end to a junction of said negative input and said capacitor and at another common end to said output.

4. An apparatus for controlling the traveling speed of a motor vehicle comprising
    means for influencing the ratio of air-fuel mixture fed to the vehicle motor,
    an electric control means for comparing a present actual traveling speed of the vehicle with a desired predetermined nominal traveling speed and transmitting a signal which is dependent on the size of the deviation for operatively controlling said influencing means,
    a control stage means for operatively receiving said signal, said control stage means including an actuator means for acting on said influencing means, and
    means connected to said electric control means and to said control stage means for adjusting and shifting said actuator means upon every change causing a reversal of movement direction of said actuator means by a definite predetermined amount in the new movement direction.

5. The apparatus as set forth in claim 4, wherein said adjusting and shifting means for immediately shifting said signal and said actuator means by a definite fixed amount in the new movement direction upon every velocity change, the latter initiating said reversal of movement direction.

6. The apparatus as set forth in claim 5, wherein said influencing means is a throttle valve.

7. The apparatus as set forth in claim 5, wherein said actuator means is a pneumatic actuator.

* * * * *